United States Patent [19]

Meyer et al.

[11] Patent Number: 5,729,283
[45] Date of Patent: *Mar. 17, 1998

[54] HOLDER FOR READING DEVICE FOR THE VISUALLY IMPAIRED

[75] Inventors: Daniel M. Meyer; James Trulaske, both of St. Louis, Mo.

[73] Assignee: Vision Technology, Inc., Town & Country, Mo.

[*] Notice: The term of this patent shall not extend beyond the expiration date of Pat. No. 5,633,674.

[21] Appl. No.: 613,493

[22] Filed: Mar. 11, 1996

Related U.S. Application Data

[63] Continuation-in-part of Ser. No. 353,801, Dec. 12, 1994, Pat. No. 5,633,674.

[51] Int. Cl.$^6$ ............................................. H04N 7/18
[52] U.S. Cl. ............................................. 348/63; 382/313
[58] Field of Search ............................ 348/62, 63, 376; 382/313, 114; 358/473, 479; 248/129, 118.5, 646; 434/112

[56] References Cited

U.S. PATENT DOCUMENTS

| | | | |
|---|---|---|---|
| 3,993,865 | 11/1976 | Browne et al. | |
| 4,115,813 | 9/1978 | Mikami | |
| 4,136,361 | 1/1979 | Doan | |
| 4,635,496 | 1/1987 | McTyre | 345/164 |
| 4,797,544 | 1/1989 | Montgomery et al. | 358/473 |
| 4,831,736 | 5/1989 | Bryant, Sr. | 345/163 |
| 4,838,791 | 6/1989 | Bogosian, Jr. et al. | |
| 4,928,170 | 5/1990 | Soloveychik et al. | |
| 4,996,775 | 3/1991 | Sass et al. | 358/473 |
| 5,046,163 | 9/1991 | Priest et al. | |
| 5,136,151 | 8/1992 | Kobayashi | 382/313 |

OTHER PUBLICATIONS

Brochure on OPTELEC—Independence Solutions for People with Low Vision 1993.
Innovations, Inc. Letter with article from Rocky Mountain News, dated Aug. 10, 1992. "Device Lets Even The Legally Blind Read".
Brochure Seewell Reading Enhancers. Model #73.
Brochure EZ Reader—Value in Low Vision Technology.
Brochure TeleSensory CHROMA CCD Jan. 1991.
Brochure TeleSensory CCTV Systems May 1991.

*Primary Examiner*—Amelia Au
*Attorney, Agent, or Firm*—Paul M. Denk

[57] ABSTRACT

A magnifying device for magnifying an object and displaying the object on a monitor is disclosed. The magnifying device includes a hand held unit or scanner and a base unit. The scanner includes a solid state camera which is mounted in a housing. The scanner includes a focusing control and a zoom control. The focusing and zoom controls are interconnected so that the image will not have to be refocused if the magnification of the image is changed. The camera converts the image to an electrical signal which is sent to the base unit. A mobile holder for the scanner is provided having an upper frame of space apart, horizontally extending arms. The arms extend laterally from the top edge of a vertical side wall. The scanner can be removeably attached between the arms and there by elevated above the object being read. The side wall has a pair of wheels attached to the bottom corners. There is a support member at one corner which extends laterally from the wall and parallel to the support arms. The support member has a wheel attached to the distal end. The three wheels are in a substantially triangular arrangement for stability and mobility. The base unit includes inverting circuitry to convert the image from black on white to white on black, if desired. The base unit can be connected either to video monitor or a standard television. When connected to the television, the devise will not impair normal use of the television when the unit is turned off. All controls for the device are located on the hand unit to be easily accessible at all times.

19 Claims, 11 Drawing Sheets

HOLDER FOR READING DEVICE FOR THE VISUALLY IMPAIRED

BACKGROUND OF THE APPLICATION

This application is a continuation-in-part of application Ser. No. 08/353,801, filed Dec. 12, 1994, now U.S. Pat. No. 5,633,674.

This invention relates to reading devices to enable people with low vision to read books, magazines, newspapers, etc. More specifically, this invention relates to a mobile holder for a hand-held unit or scanner which contains a camera which may be passed over text to display the text in greatly magnified form on a screen, such as a television screen.

Low vision is defined as a condition where ordinary eye glasses or contact lenses cannot provide sharp sight. Presently, the number of people having low vision is estimated to be over 14 million people in the United States alone. Low vision can be caused by a variety of eye problems. Macular degeneration, glaucoma, diabetic retinopathy, detached retina, and retinitis pigmentosa are but a few of the conditions which can cause low vision. Individuals with low vision find it difficult, if not impossible, to read newspapers, books, recipes, prescriptions, or other reading material. Reading glasses and magnifying glasses provide insufficient enlargement for large numbers of people.

One generally well known method of providing greater magnification is the use of closed circuit television systems which include a video camera, a monitor for displaying the image, and a means for transferring the image from the camera to the monitor. These systems fall generally into two categories. The first category includes desk-top systems which have a video monitor with a camera mounted beneath it. A support arm holds the monitor, camera, and control box above a movable support platen for holding the material to be viewed. Examples of desk-top systems are shown in U.S. Pat. Nos. 3,819,855 to Rush et al., 3,816,646 to Cinque, 4,115,813 to Mikami, and 4,928,170 to Soloveychik et al. These systems are large, and thus not easily transportable.

The second category of devices includes a variety of hand-held systems. These systems consist of a video monitor connected to a small camera housed in an enclosure which can be moved about the printed material by hand. Such hand-held devices are shown in U.S. Pat. Nos. 3,993,865 to Browne et al, 4,136,361 to Doan, and 5,046,163 to Priest et al.

All of these prior devices have sever limitations. They are often difficult to use, lack portability, and restrict the user to a specific position in front of the unit in order to work the controls. Earlier attempts at hand-held systems have major draw-backs. When their camera lens is placed close to the object (one-half to two inches away) sever barreling, or fish-eye, distortion and astigmatism distortion become quite evident. Moreover, variable magnification in hand-held units has been provided by changing the distance of the camera from the printed matter. Some units provide exchangeable length legs or attaching the camera to a vertically movable stand. Changing leg extensions sizes is clumsy and frustrating for someone partially sighted and moveable stands are so large they are no longer a truly hand-held device.

There exists therefore, a significant need for a truly portable full function hand-held video system that provides a substantially distortion free image with a variable magnification feature that automatically stays in focus and is easy to use. I have addressed that need with my hand-held video system as disclosed in application Ser. No. 08/353,801.

Although the hand-held unit provided therein works well for its intended purposes, I have discovered that the overall utility of the unit can be improved by attaching the hand-held unit to a mobile holder that effectively elevates the unit from the object being visualized and also improves the mobility of the unit.

SUMMARY OF THE INVENTION

One object of the present invention is to provide a mobile holder for the hand-held unit or scanner of a hand-held reading device for people with low vision which and increases the mobility of the scanner.

Furthermore, a significant feature of this invention is the added space under the inventive holder to allow the user to write or perform other tasks at the same time while viewing the screen. For example, the user may examine or repair small devices, manicure nails, thread a needle, and the like.

Another object of the present invention is to provide a mobile holder for the hand-held unit or scanner of a hand-held reading device for people with low vision which elevates the scanner.

Another object is to provide such a holder that allows the scanner unit to move across reading material in a manner similar to a computer mouse.

Another object is to provide such a reading device which will display the text substantially free of distortion.

Another object is to provide such a reading device which will automatically focus the text.

Another object is to provide such a reading device which has variable magnification.

Another object is to provide such a reading device which may be used with virtually any monitor.

Another object is to provide such a reading device which is easy to use.

These and other objects will become apparent to those skilled in the art in light of the following disclosure and accompanying drawings.

In accordance with the invention, generally stated, a magnifying device for magnifying an object and displaying the object on a monitor is provided. The device includes a hand-held unit or scanner and a base unit. The hand-held unit or scanner is operatively connected to the base unit, and the base unit is operatively connected to the monitor. The scanner has a housing including a top, a bottom, and side walls, the bottom defining an opening. The housing has legs depending from the bottom of the housing to maintain the housing a predetermined distance above the object magnified, and rollers extending between the legs to facilitate movement of the scanner over the object. A solid state camera is housed in the scanner above the opening. The camera is of the type which converts an optical signal to an electrical signal and includes a focusable lens. Focusing and zoom controls are provided to focus the lens and increase or decrease the size of the image displayed on the monitor. A novel mobile holder for the scanner is provided. The holder has a vertically extending support member with a top upper frame comprising two spaced apart horizontally extending arms which are integrally connected at one end to the upper edge of vertical support member. The support arms define a space for the seating of the scanner. The vertical support member has first and second spaced wheels at the lower end. A laterally extending bottom support member extends from lower end of the vertical support member and substantially parallel to the support arms. The support member has a third wheel attached at the distal end. The three wheels are in a substantially triangular relationship for stability. The vertical support member is of a predetermined height so that when the scanner is secured between the arms it is effectively elevated above the object to be read and the wheels allow it to be more easily and smoothly rolled across the object to be read.

Inverting circuitry is provided in the base unit for inverting the colors of the display, so that the display can be changed, for example, from black text on a white background to white text on a black background, and vice versa. An inverting switch which activates or toggles the inverting circuitry is provided on the hand-held unit or scanner, so that it may be easily operated by the user. An on/off switch is also located on the hand-held unit so that the user can turn on and off the magnifying device from the hand-held unit.

The magnifying device is provided with a light housed in a diffuser to illuminate the object. The light is of sufficient strength to illuminate the object for the camera so that a good image of the object can be produced on the monitor. The light is preferably mounted to the underside of the housing bottom, adjacent the opening. To provide even lighting, lights are provided on either side of the opening.

The camera is mounted to a mounting board which has an opening through which said camera lens extends. A corrective lens is positioned beneath the camera lens to prevent distortion of the object magnified by the device, i.e. to minimize any fish-eye type distortion which has been produced by prior art magnifying devices. The corrective lens is fixed in a lens housing which is rotatably fixed to the camera lens.

The focusing control includes a focusing knob operably connected to the camera lens to rotate said camera lens to focus the camera. The focusing control includes a focusing rod which rotatably extends through the mounting board and the housing. The focusing knob is fixed to the rod externally of the hand-held unit housing and a pulley fixed to a bottom of the focusing rod beneath the mounting board. The lens housing defines a second pulley, and a band is provided to extend around the two pulleys, such that when the focusing knob is rotated, the camera lens is rotated, to focus the image. Preferably, a stop pin extends down from the camera mounting board and a limiting pin extends radially outwardly from he corrective lens housing to prevent rotation of the camera lens beyond normal operating limits. Preferably, the camera lens is prevented from rotating more than three or four times.

The zoom control is operatively connected to said mounting board to vertically move the mounting board to change the distance between the camera lens and the object being magnified. The housing includes a pair of guide rods extending between the top and bottom of the housing. The guide rods pass through the mounting board so that the mounting board may be moved vertically relative to the housing. Preferably linear bearings are press fit through the mounting board through which the guide rods extend. The zoom control includes an elongate zoom rod rotatably journaled about the focusing rod intermediate the focusing knob and the mounting board, and is thus vertically fixed relative to the focusing control and the mounting board. A helical groove is formed in said zoom rod and a vertically fixed pin is mounted in the housing to engage the zoom rod groove. Thus, when said zoom rod is rotated, it moves vertically relative to the housing, and vertically moves the mounting board, and hence the camera. Depending on the direction of rotation of the zoom rod, the camera will be moved closer to, or farther from, the object, to increase or decrease, respectively, the size of the image displayed on the monitor. Because the zoom control is interconnected with the focusing control, the camera need not be refocused after the magnification of the object has been changed.

The monitor may be either a video monitor or a television. The base unit includes a video out terminal, an RF in terminal, and an RF out terminal, so that it may be selectively connected to either the video monitor or a television using a cable. If the base unit is to be connected to a video monitor, the cable is received in the video-in terminal of the monitor and the video-out terminal of the base unit. If the monitor chosen is a television, the cable is received in the RF-out terminal of the base unit and the antenna terminal of the television. An antenna or cable TV cable can be connected to the RF-in terminal of the base unit. The magnifying device can thus remain connected to the television when not in use without interfering with normal operation of the television.

The magnifying device, as will be explained in full detail below, is one in which all the operating controls are held in the scanner, and may be connected to either a monitor or a television. Because of its small size, it is easily transportable. Further, the ability to invert the color scheme of the image displayed, allows the user to choose the best viewing format.

DESCRIPTION OF THE PREFERRED EMBODIMENT

Figure 1:
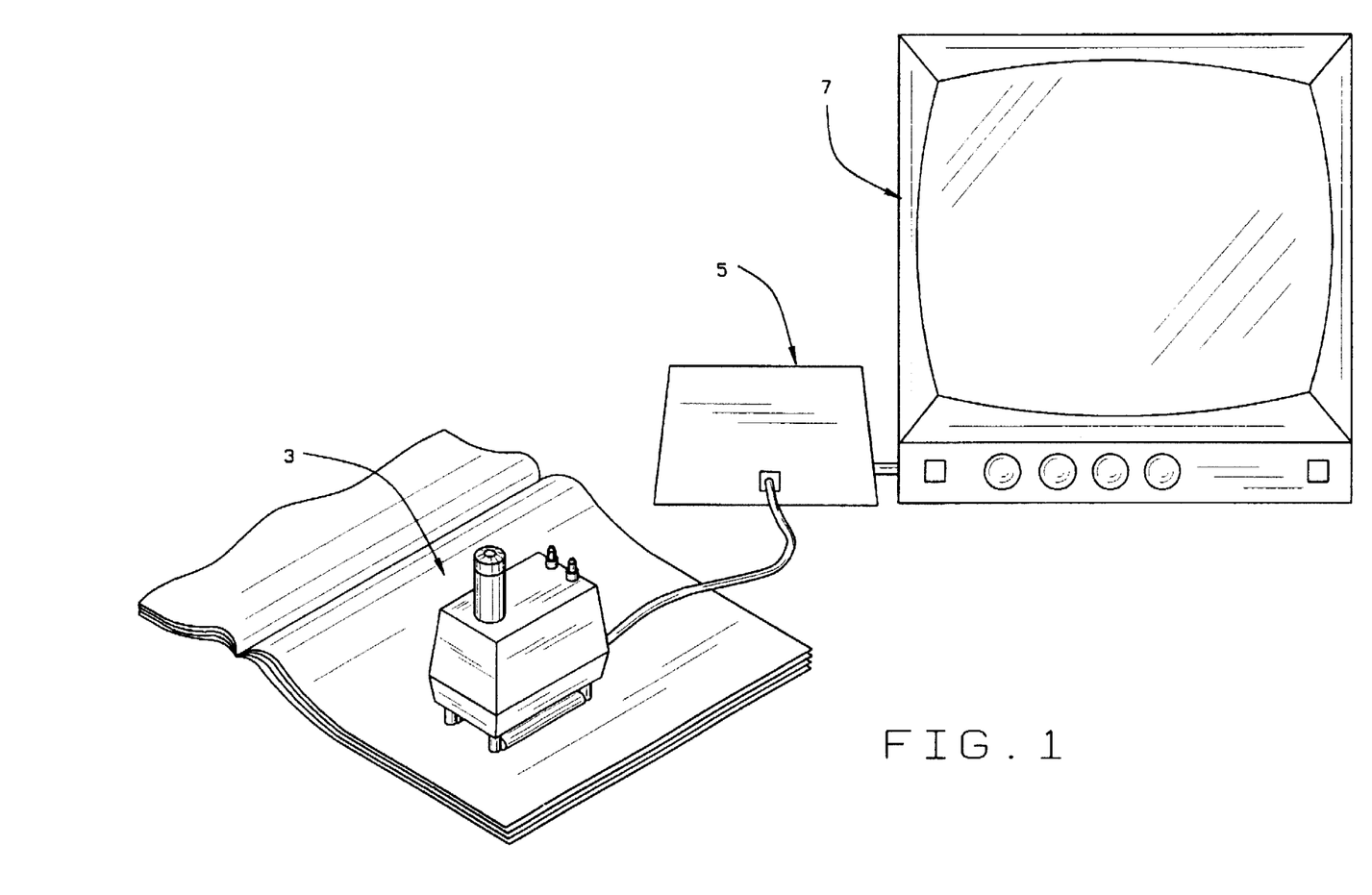
FIG. 1 is a is a perspective view of a reading device of the present invention operably connected to a monitor.

A reading or text magnification device 1 is shown generally in FIG. 1. Device 1 includes a hand-held unit or scanner 3 which is operatively connected to a base unit 5 to transmit images to the base unit. The base unit 5 houses, among other items, the power supply, and is thus plugged into a wall outlet to provide power for the device. Base unit 5 is operatively connected to a monitor 7, such as a video monitor or television, to display magnified text on the monitor.

Hand-held unit or scanner 3, shown in detail in FIGS. 2–6, is sized to be easily held in a user's hand. Scanner 3 includes a camera assembly 9 which is enclosed by a housing 11. Housing 11 includes a housing top 13 and a housing bottom 15. Housing bottom 15 includes a bottom wall 17 having an opening 19 formed therein. Lights 21 are placed on opposite sides of opening 19 to provide light for the camera assembly 9 and are preferably housed in diffusers. The diffusers disperse the light to lessen any glare from the lights on the text. Two pair of support legs 23 extend downwardly from bottom 17. Rollers 25 extend between the legs 23 and allow the scanner 3 to be easily rolled across a page of text, without getting caught on the page.

Figure 2:
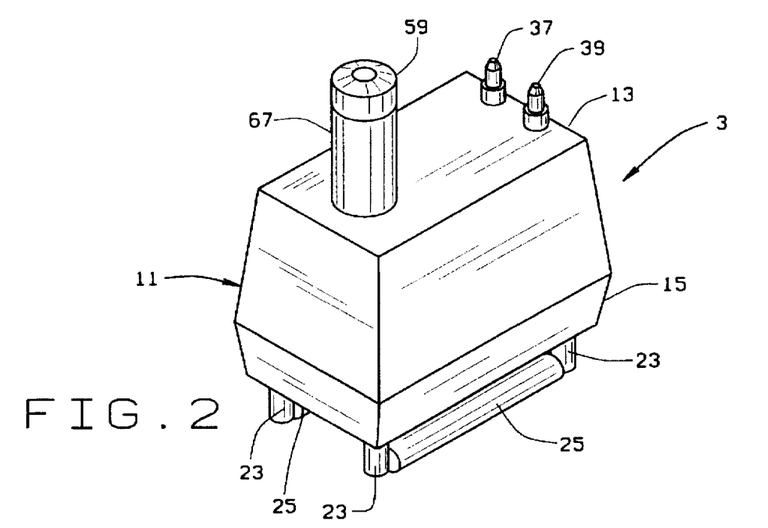
FIG. 2 is a perspective view of a hand-held unit of the reading device.
Figure 3:
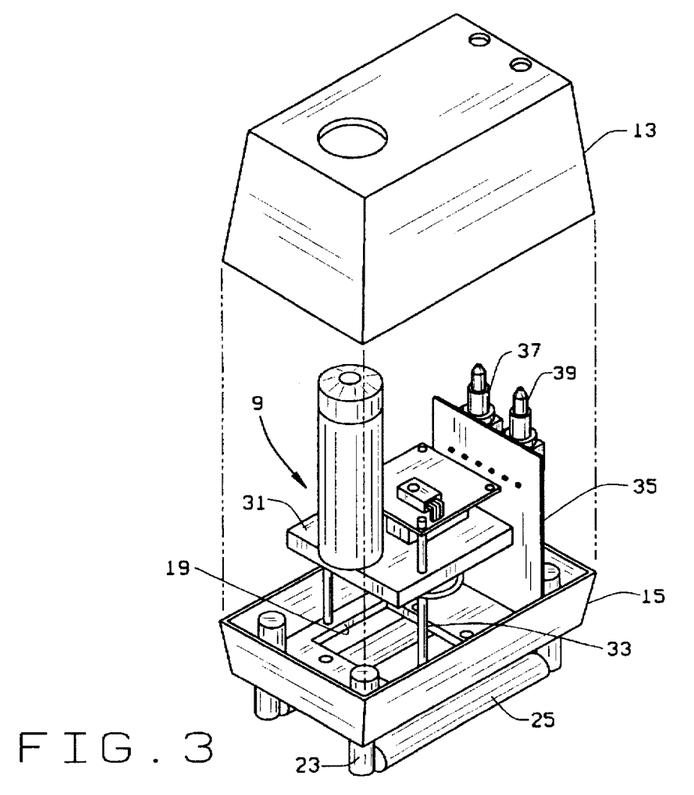
FIG. 3 is an perspective view of the hand-held unit with a cover of the hand unit removed.
Figure 4:
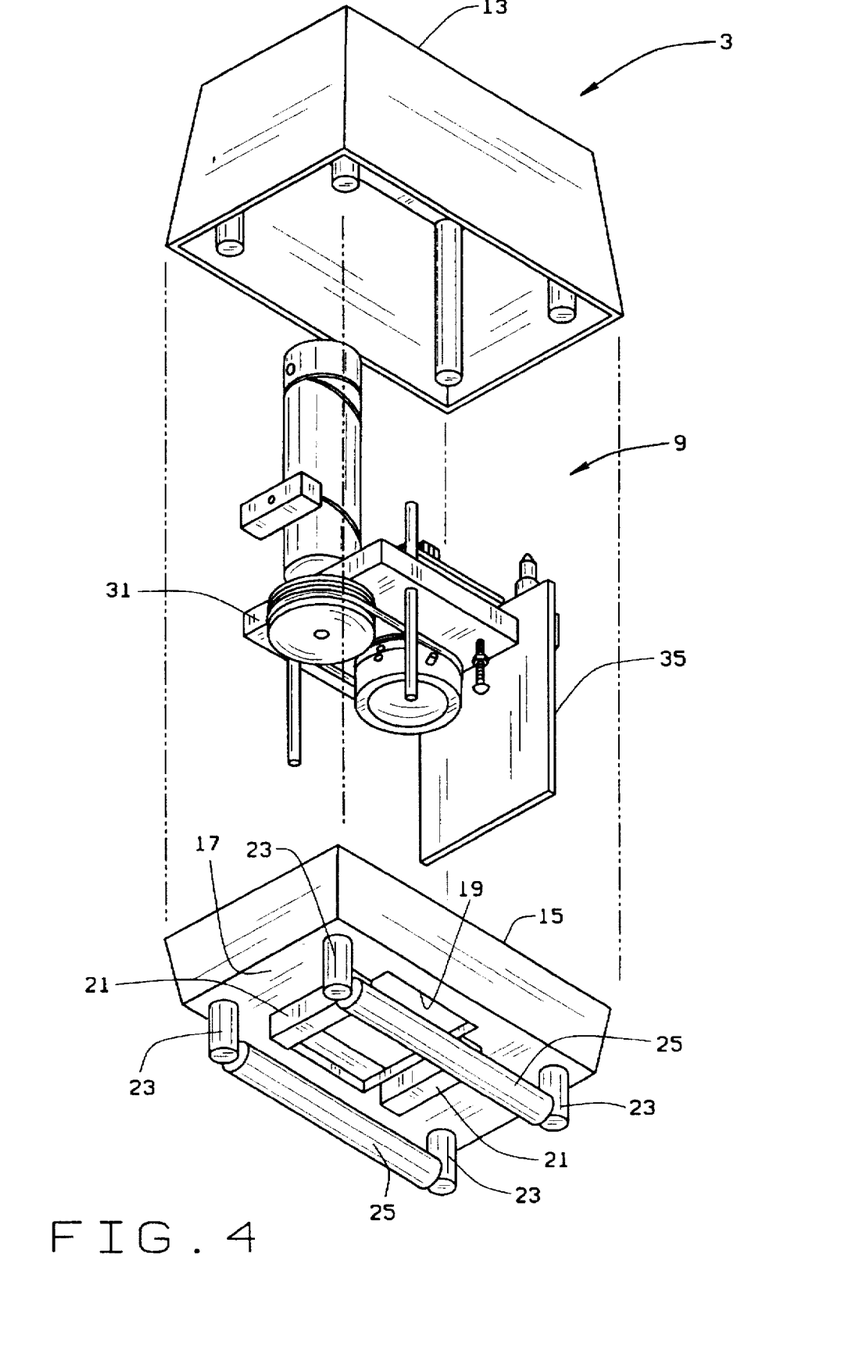
FIG. 4 is an exploded view of the hand-held unit.
Figure 5:
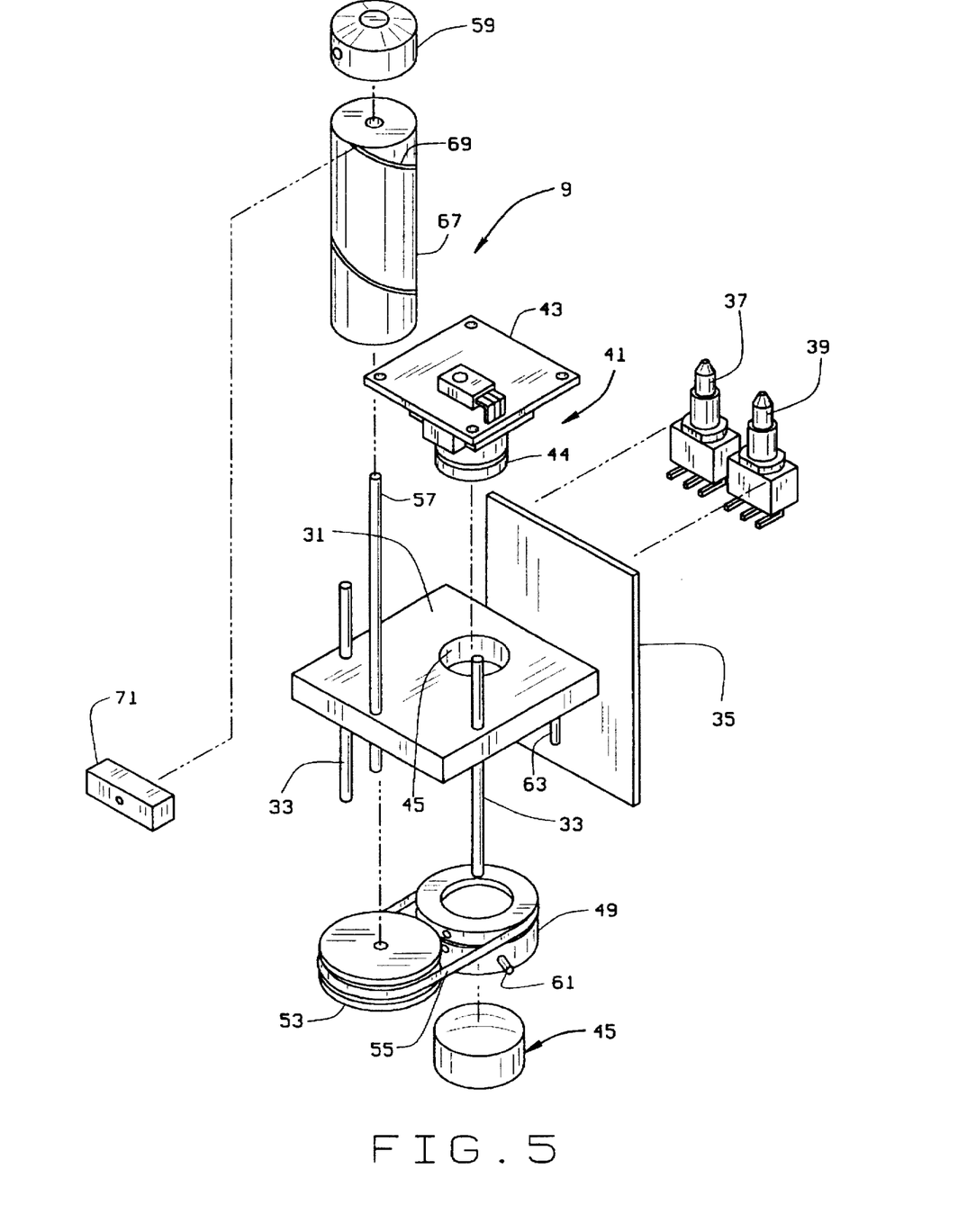
FIG. 5 is an exploded view of a camera mount and focus control assembly of the hand-held unit.
Figure 6:
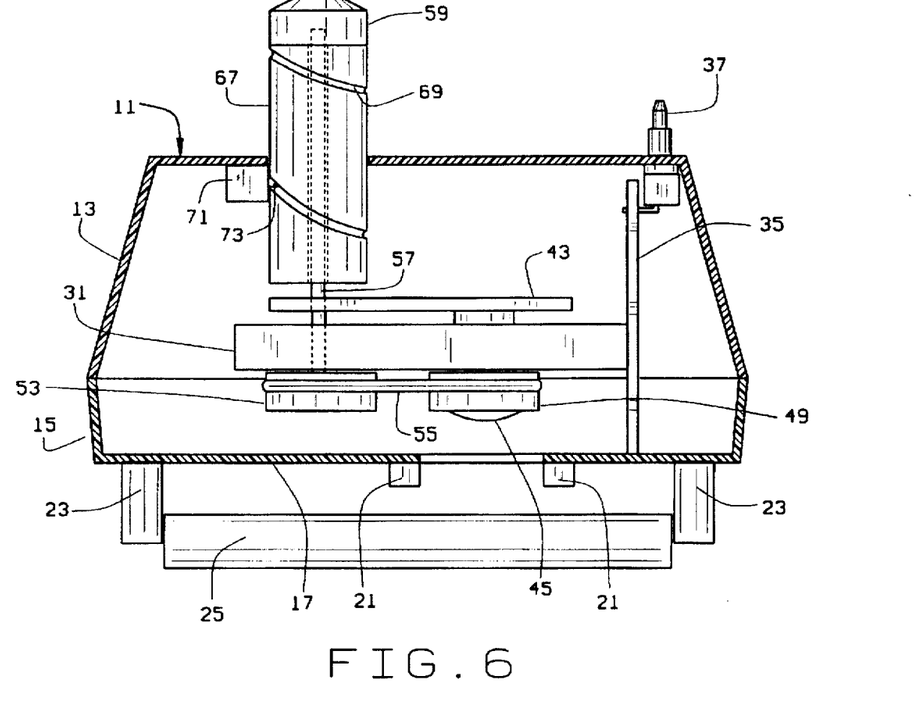
FIG. 6 is a cross-sectional view of the hand-held unit.

Camera assembly 9 includes a platform 31 having a pair of guide rods 33 extending therethrough. Platform 31 is preferably movable vertically relative to rods 33. Guide rods 33 are received in small bores formed in housing bottom 17 to properly position platform 31 in housing 9. Preferably, linear bearings 34 are press fit into the opening in the platform 31 and the guide rods 33 pass through the linear bearings. The guide rods are longer than the board is thick, and thus extend slightly above and below the board 31. Although not necessary to operation of the device, the linear bearings 34 significantly improve the stability of the board and makes movement of the board 31 over the guide rods 33 smoother. An extension of the bearing 34 of about 1/8" above the board is sufficient to increase the stability of the board. Of course, the bearing could be longer or shorter, if desired. A switch PC board 35 is adjacent an edge of platform 31, to define a supporting third leg for the platform to balance the platform in the housing. Platform 31 can thus be maintained in a level position, generally parallel to the bottom of the housing. Two switches, a power switch 37 and an inverting switch 39 are electrically connected to the switch PC board 39. Switches 37 and 39 are eternally accessible, preferably through the housing top 13 as shown in FIGS. 1–3, so that the device 1 may be operated by the user.

A camera 41 mounted to a PC board 43 is secured to platform 31. Platform 31 includes an opening 45 through which the camera extends. The camera lens 44 is in axial alignment with the bottom housing opening 19. The camera is preferably a solid state 1/3" CCD camera which will convert an optical signal to an electrical signal. Preferably, the camera has a focal length of between 20 mm and 31 mm and an aperture (f) of between 3.8 and 4.0. Preferably, the focal length is about 25.8 mm. Cameras which have been found to be acceptable are Chinon Model CX-060 with a 4 mm focal length, an aperture (f) of 3.5 and an 86° field of view, available from Chinon America, Inc., Electronic Imaging Division, in Mountainside, N.J. Also acceptable is camera model VM-311 with a 3.8 mm focal length, F/1.6 from Samsung Opto-Electronics America, in Secaucus, N.J., and Cumputar Model EM-200-L38 with a 3.8 mm focal length available from Chugai Boyeki (America) Corp., in Commack, N.Y.

Figure 7:
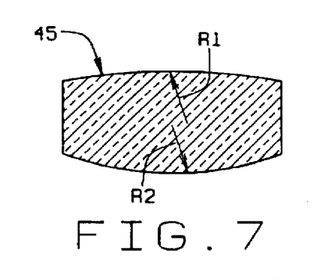
FIG. 7 is a cross-sectional view of a corrective lens used in association with the hand-held unit to prevent distortion of enlarged text.

To prevent the camera 41 from producing a distorted image (i.e. a fish-eye image) an adapter lens 45 is mounted beneath the camera lens. Lens 45 is preferably made from grade B glass and is convex on both side. The radii of the two sides of lens 45 are different. Referring to FIG. 7, lens 45 has a radius $R_1$ of about 39.06" and a radius $R_2$ of about 22.87". The center thickness of the lens is between 11.6 mm and 12.0 min. Lens 41 is press fit in a lens housing 49 which is rotatably fixed to the camera lens 44.

Scanner 3 includes both a focusing control and a zoom control. Lens housing 49 includes a circumferential groove 51 so that housing 49 forms a pulley. A second pulley 53 is positioned adjacent pulley 49, and the two pulleys are operatively connected by a band 55. A focusing rod 57 extends through platform 31 and is rotatably connected to pulley 53, at the bottom of the rod. Rod 57 extends through housing cover 13, and a focusing knob 59 is rotatably secured to the top of the rod. Thus, when a user rotates knob 59, pulley 53 is rotated, to rotate pulley 49. Because pulley 49 is fixed to camera lens 44, the camera lens is rotated to focus the camera. Pulley 49 includes a stop pin 61 which will contact a limiting post 63 if the pulley is rotated too far. Limiting post 63 and stop one 61 prevent the pulley 49 from being rotated more than four revolutions. This is sufficient to move the lens between its two extreme positions (i.e. its furthest extended position and its least extended position).

The zoom control is operable to raise and lower the camera assembly 9 within the housing. Switch PC board 35 is fixed within housing 11. Assembly 9 thus moves vertically relative to board 35. A zoom knob or rod 67 is rotatably mounted about focus rod 57 and includes a generally helical groove 69. A zoom block 71 is secured to the inside surface of housing top 13. Block 71 includes a pin 73 which extends into the helical groove 69. (FIG. 6) Thus, when knob 67 is rotated, the helical groove 69 interacts with the pin 73, and knob 67 is raised or lowered. The focus knob 59 acts as a cap or stop for knob 67 to prevent the knob from moving vertically relative to focus rod 57. Thus, the focus rod acts as a tie rod to tie the knob 67 to the camera platform 31, and, when the zoom knob 67 is rotated, the camera assembly will be raised or lowered to change the magnification of the text shown on display 7. The zoom control and focus control are preferably interconnected, as shown, to reduce the number of knobs protruding from the housing. This also reducing the number of parts involved in the manufacture of the scanner 3 and thus reduces its assembly time and cost.

A spring 74 is preferably placed about focusing rod 57 to be positioned between mounting board 31 and zoom rod 67. With the pulley 53 connected to one end of rod 57 and the fine tuning knob 59 connected to the opposite end, spring 74 is compressed. When the spring is compressed, it biases zoom rod 67 away from mounting board 31 to create a proper amount of spacing between the mounting board and the bottom of the zoom rod to facilitate smooth operation of the zoom control. The spring 74 also puts pressure on the zoom rod to force it against the fine tuning knob 59. This creates a friction between the zoom rod and the fine tuning knob to cause the fine tuning knob to turn in unison with the zoom control knob. Because the fine tune knob is connected to the camera lens via the threaded rod 57, the pulley and belt, focus is maintained as the zoom rod is turned. If the spring 74 is not used, some other means, such as a felt washer, would be needed to provide the proper friction so that the knob 59 will rotated when knob 67 is rotated, yet which will allow the two controls to be operated separately. The fine focus knob can be turned independently of the zoom rod by holding the zoom rod still while the fine focus knob is turned.

Camera PC board 43 is electrically connected to the switch board 35. Circuitry on board 43 converts the optical signal produced by the camera to an electrical signal. This electrical signal is then sent to the switch board 35 by the electrical connection between the two boards. The electrical connection between the cameral PC board 43 and switch board 35 also facilitates the transmission of control signals between the PC board and the switch board. For example, depressing the on/off switch will activate or deactivate the camera.

Figure 11:
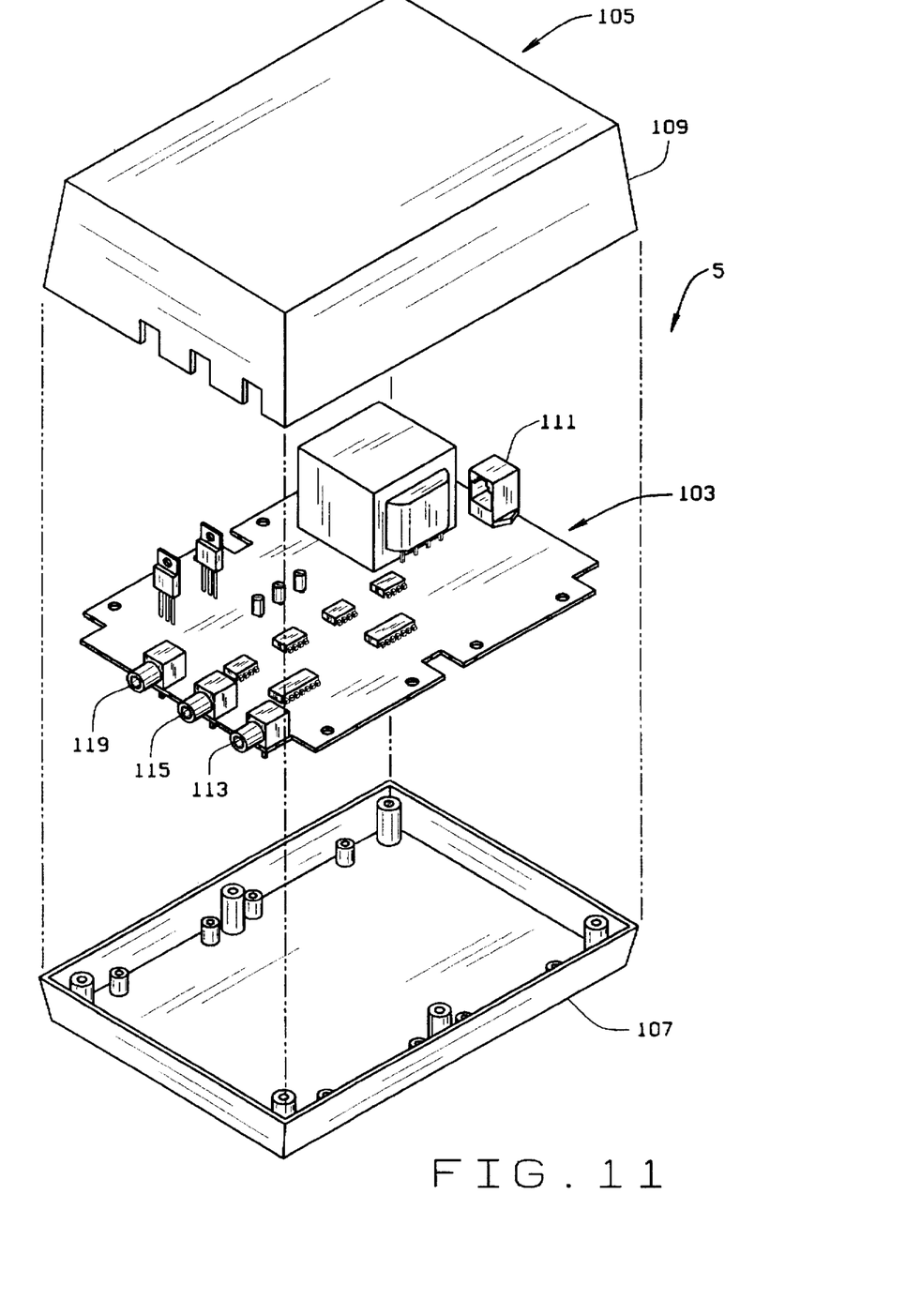
FIG. 11 is an exploded view of the base unit of the reading device.

Switch board 35, in turn is electrically connected to base unit 5 by an electrical line 101 which transmits the electrical signal produced by the camera PC board to the base unit and control signals produced by the switches 37 and 39. (FIGS. 13A and 13B) Base unit 5 is shown in more detail in FIG. 11. Unit 5 includes a PC board 103 contained in a housing 105 having a bottom 107 and a top 109. Board 103 includes an input 111 which receives line 101, and electrically connects line 101 to board 103. Board 103 also includes an antenna jack 113 to which an antenna or TV cable can be attached, a TV out jack 115 to connect the unit 5 to a standard television through the televisions antenna jack 117, and a video out jack 119 to connect the base 5 to a monitor via the monitors video in jack 121.

Figure 12:
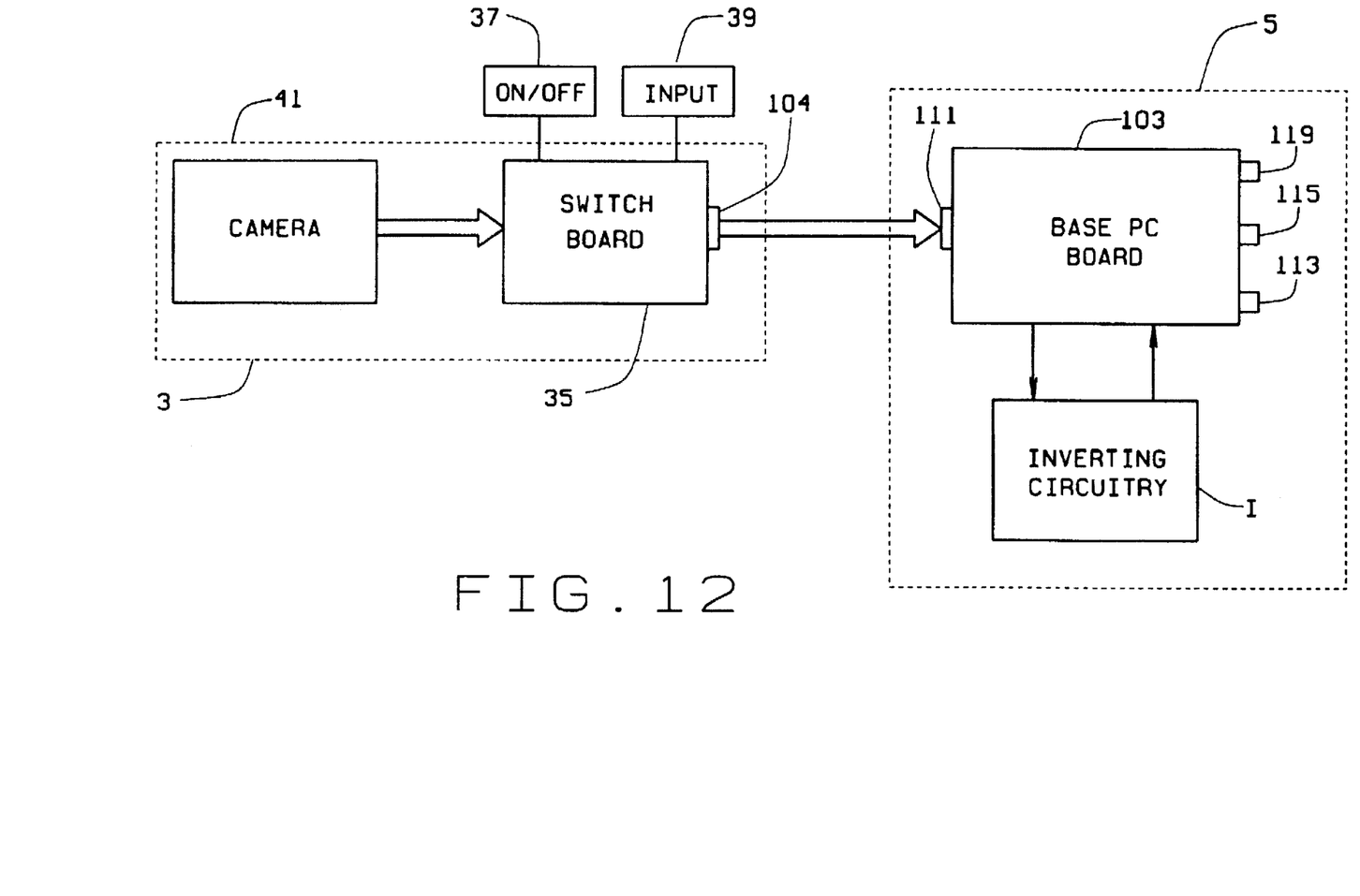
FIG. 12 is a block diagram of the reading device.

PC board 103 includes inverting circuitry I (FIG. 12) which can be activated to invert the picture shown on the monitor, i.e. it can change the display from black text on a white background to white text on a black background. The circuitry shown is the preferred circuitry which is compatible with the output produced by the camera used. Different circuitry may be needed if a camera which produces its output in a different format. The video signal from cameral 41 is initially passed through a switching circuitry S. Switching circuitry S determines if the inverting switch 39 has been toggled to invert the picture. If so, circuitry S sends the video signal to inverting circuitry I. Circuitry I has an input 131 which receives the signal produced by the camera board 43 and passed on by switching circuitry S. The video signal is passed through the circuitry to an output 133 which is connected to switching circuitry S to send the signal back to circuitry S. Circuitry S is also connected to terminals 113, 115, and 119, to pass the signal to the proper terminal so that the picture produced can be viewed.

If the picture is to be viewed on a television, the video image is also passed to an RF Modulator M, after the signal is returned from the inverting circuitry. Modulator M has an output sends the modulated signal to terminal 115, so that the picture can be viewed over a television.

Figure 12A:
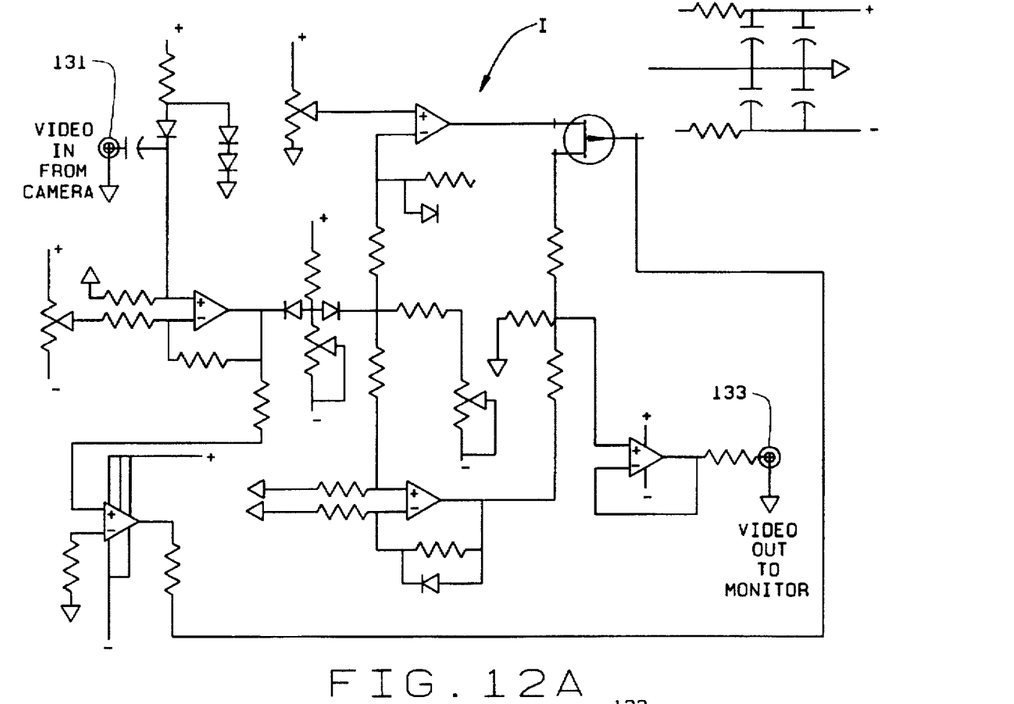
FIG. 12A is an electrical schematic of an inverting circuit contained in a base unit of the reading device.

The electrical connections circuitry is shown in part in FIG. 12A. Device 1 receives power from a wall outlet. It includes an electrical cord which may be plugged into a wall outlet to provide electricity to device 1. The electricity from the outlet is delivered to a 12V power supply PS contained in base unit 5. The power supply PS is a conventional power supply which converts the AC current to DC. Preferably, it is the power supply is a center tap transformer. The device 1 is activated by on-off switch 37 on board 37 in the hand-held unit 3. Switch 37 is electrically connected to camera 41, to activate the camera, and to the inverting switch 39, which is also mounted on switch board 35. The video signal produced by the cameral is carried from the camera to the base unit over a video line 141. Video line 141 is feeds into the video input 131 of the inverting circuitry I in the base unit. Video line 141 is also connected to a switch 143 in the base unit. The inverted video signal which exits circuitry I from output 133 is also connected to switch 143, over a line 145. Switch 143 is electrically connected to inverting switch 39, in the hand piece 3, by a line 147. A video signal exits switch 143 over a line 149. The toggling of switch 39 opens and closes switch 143, such that when switch 143 is in one mode, the inverted signal from circuitry I is passed through switch 143 to line 149, and in the other mode, the unmodified signal from line 141 passes through switch 143 to line 149. Switch 143 thus acts as a gate or diverter which lets one or the other of the unmodified and inverted signals through to line 149. Line 149, in turn, is connected to the video out terminal 119, and to an RF modulator M over a line 151. The modulator M is, in turn, connected to the TV hookup 115, through a switch 153, so that the video signal can be viewed on a television set. The antenna in port 113 is also connected to switch 153. Switch 153 is electrically connected to on-off switch 37 by a line 155. If the device 1 is connected to a TV, as in FIG. 13B, when the device is off, switch 153 is in a first position or mode to allow the signal from the antenna to pass through switch 153 to the port 115. When the device is turned on, the switch 153 is turned to a second position or mode in which the signal from the switch 143 and RF modulator M is passed through switch 153 to port 115. Modulator M is operable to switch the device to output a signal which can be received over either channel two or channel three of the television, similar to the channel switch in a VCR.

Although not necessary, circuitry I, switches 149 and 153, and modulator M are all contained on, and connected to, board 103. Power supply PS is operatively connected to board 103 to supply power to the device 1. As can be appreciated, lines 141,147, and 155, which exit from hand unit 3 are all carried by cord 101.

The noted above, inverting circuitry I is toggled on and off by switch 39. As can be appreciated, switch 39 produces a toggling signal which is transmitted to switch board 35, through line 101, to board 103 and switch 143 to toggle the inverting circuitry, i.e. activate it or deactivate it. The location of the inverting switch makes operation of the inverting feature by the user simple. The user does not have to fumble around to locate the base unit, and then locate a switch on the base unit. The switch is at the user's fingertips, to be activated by the user when desired.

Figure 13A:
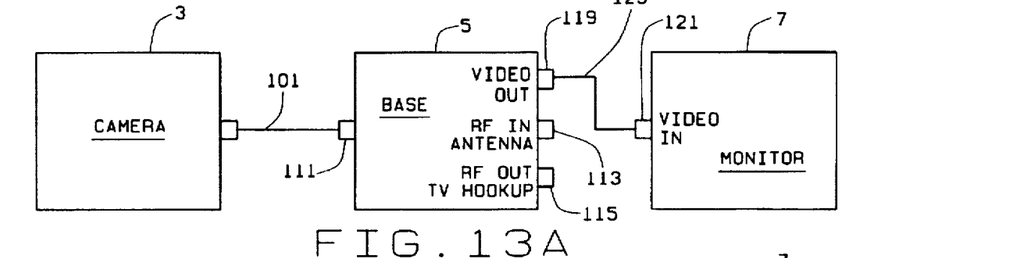
FIG. 13A is a block diagram of the connection between the reading device and a monitor.

As alluded to above, magnification device 1 can be connected to either a monitor, such as a video monitor, or a standard television set. As shown in FIG. 13A, when the device 1 is connected to a monitor, a cable 123 is inserted in the Video Out terminal 119 of base unit 5 and is connected to the Video In terminal 121 of the monitor.

Figure 13B:
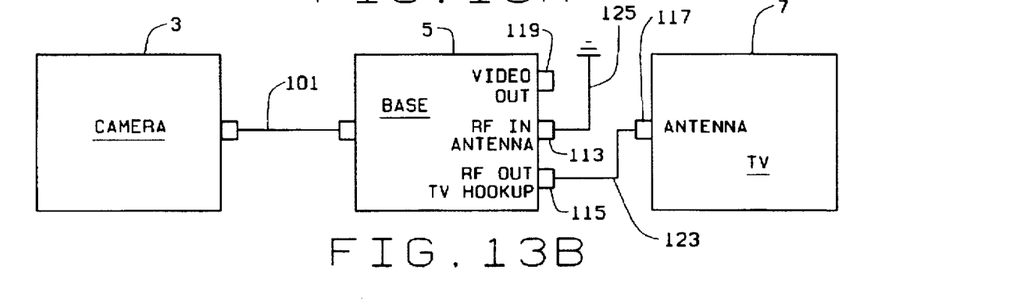
FIG. 13B is a block diagram of the connection between the reading device and a television.

As shown in FIG. 13B, when the device 1 is to be connected to a television, cable 123 is connected between the RF Out terminal 113 of base unit 5 and the Antenna terminal 117 of the television. An antenna 125 or Cable TV cable is connected to the RF In terminal 113 of the base unit 5. This connection is similar to the connection of a VCR to a television. When the device 1 is connected to a television, it need not be disconnected from the television when it is not in use and the television is to be used. As explained above, when device 1 is not in use, the signal received by antenna 125 is passed to cable 123 to be received by the television. The television can thus be used as a television. However, when the device 1 is turned on using switch 37, the signal received by the antenna is interrupted or disconnected, and the signal produced by the device 1 is transmitted to the television so that the user may read the text over which the device is placed.

In operation, device 1 is turned on using on/off switch 37 and the hand-held unit is placed on the book, newspaper, magazine, etc. which is to be read. Using focusing knob 59, the user can focus the text. If the text is too small, the text can be enlarged using zoom knob 67. The interconnection of the zoom and focusing mechanisms enables the text to stay in focus as the size of the text is changed. Thus, the user should not need to refocus the text if the zoom control is used. If the user finds the text to be easier to read if it is white text on a black background (or vice versa), the user simply depresses switch 39 on scanner 3.

The rollers 25 enable the user to move the scanner 3 over the text which is enlarged. The device is provided with rollers 25 which are spaced a determined distance from the bottom 17 of the scanner by legs 23, the camera is maintained at that distance without the user supporting the scanner above the text. The user thus need not support the camera above the text, a feat which can be both trying and tiring. However, we have determined that the distance above the object to be read that is created by this design is not always appropriate to give the best results. Moreover, the rollers 25 do not always provide the best mobility on all surfaces. Therefore, we have invented the novel mobile scanner holder of the present invention that will be described in detail below.

Figure 8:
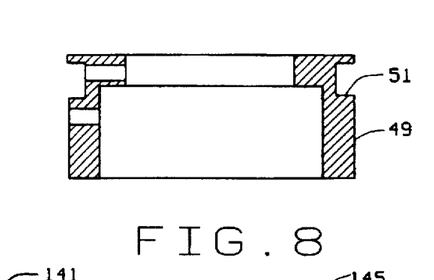
FIG. 8 is a cross-sectional view of a lens mount in which the corrective lens sits.
Figures 9, 10:
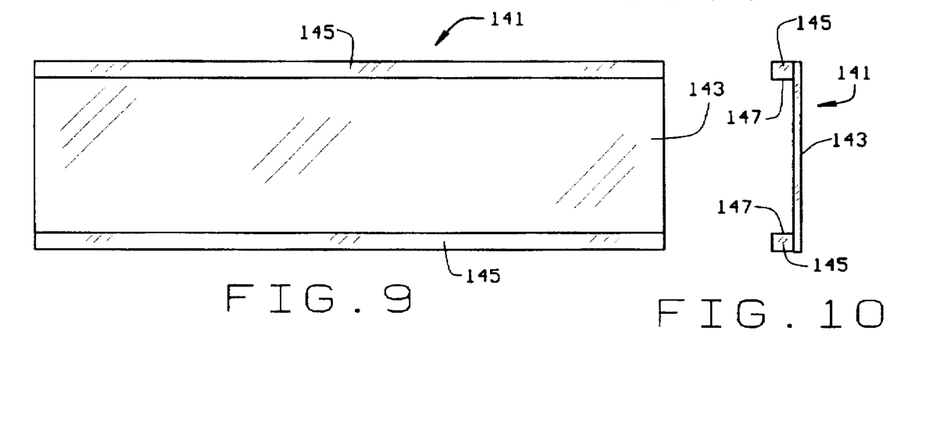
FIG. 9 is a top plan view of a guide of the reading device.
FIG. 10 is an end elevational view of the guide.

If the unit 3 is to be passed over a page which is not generally planar, the user may use a guide tray 141. (FIGS. 8 and 9). Tray 141 is placed over the book, magazine, etc. and provides a flat, planar surface over which the camera can be rolled. Tray 141 includes a board 143 made from a transparent material, such as a clear acrylic sheet. Side bars 145 extend the length of the tray, along the edges of the board 143. Although not necessary, bars 145 are also preferably made from a clear acrylic. The distance between the inner surfaces 147 of bars 145 is at least slightly wider than the distance between the outer surfaces of the legs 23, so that the bars do not interfere with the easy movement of the unit 3 across the tray 141.

Guide tray 141 has been found to be of great use. It provides a straight and smooth path for the camera to be moved over. This is especially helpful for those, such as the elderly or individuals with diseases such as Parkinson's disease, who no longer have a steady hand. The guide tray can also be used as a "training device" to enable users to move the camera across a page as they learn get the "feel" of the hand-held portion of the device.

As can be seen, the device 1 provides a magnifier for text which can be connected either to a monitor or a television. If connected to a television, it can be left connected to the television without interrupting normal operation of the television when device 1 is not in use. All controls are on the handpiece, facilitating easy control of the device. Further, the inverting circuitry allows the user to select a format which may be easier to read. The hand-held portion 3 of the device is small. Preferably it is only about 2.3" tall, 3.3" long, and 2" wide. It can thus easily fit in the palm of an adult for easy grasping and control of the hand-held portion.

Figure 14:
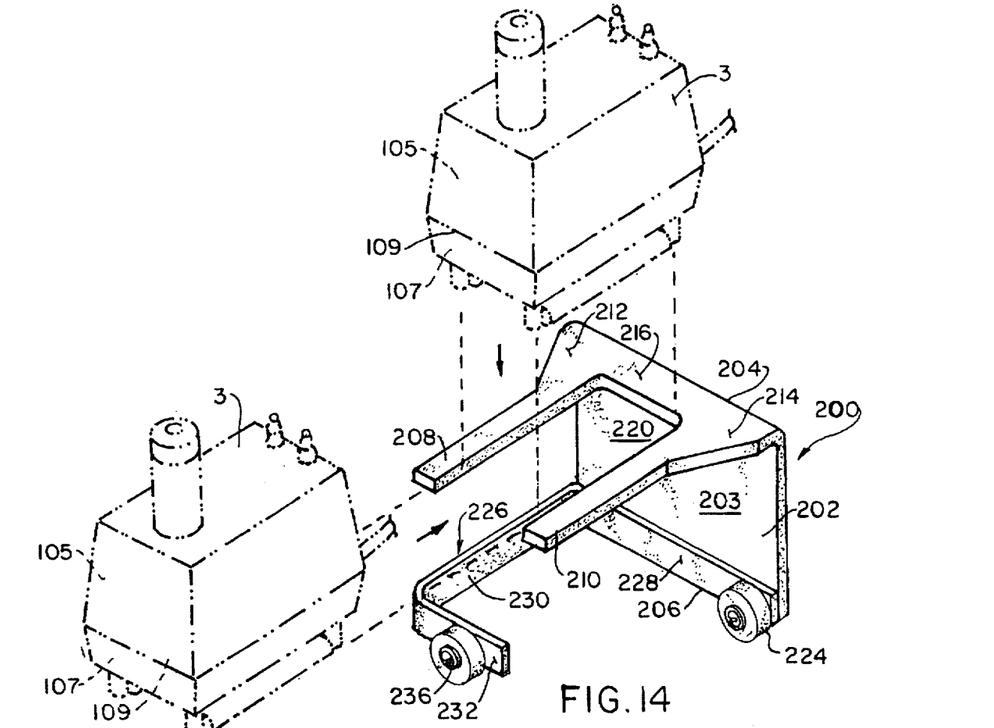
FIG. 14 is a perspective view of the mobile holder for the hand-held unit of the present invention, the hand-held unit being shown in phantom to illustrate environment.
Figure 15:
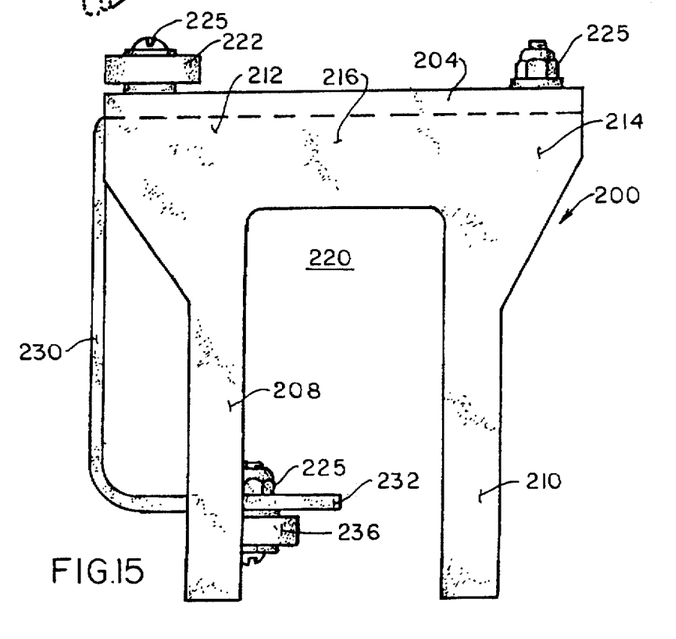
FIG. 15 is a top plan of the mobile holder of the present invention.
Figure 16:
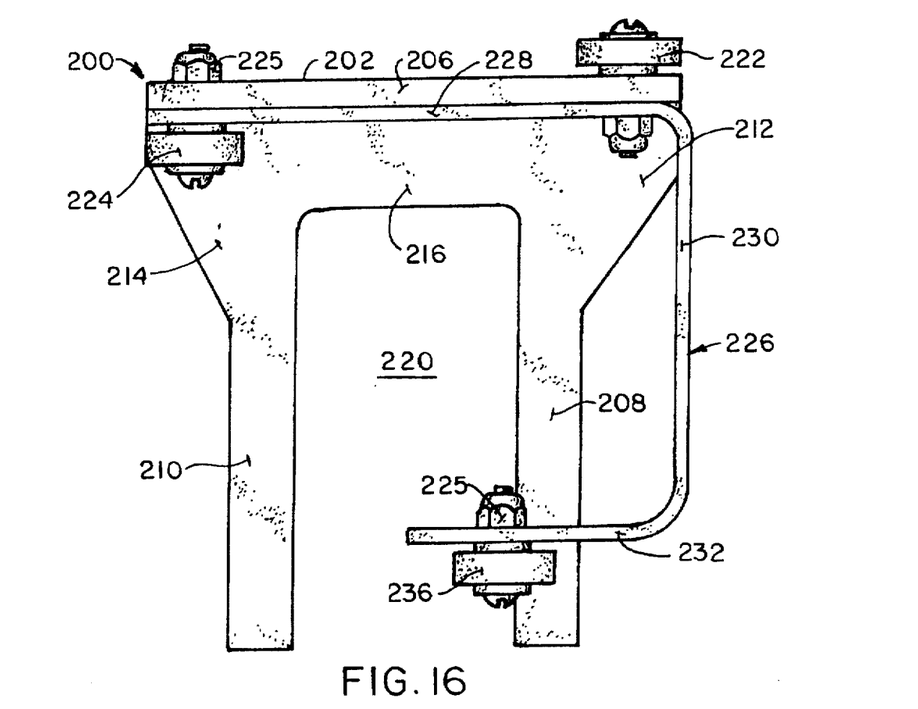
FIG. 16 is a bottom plan thereof.
Figure 17:
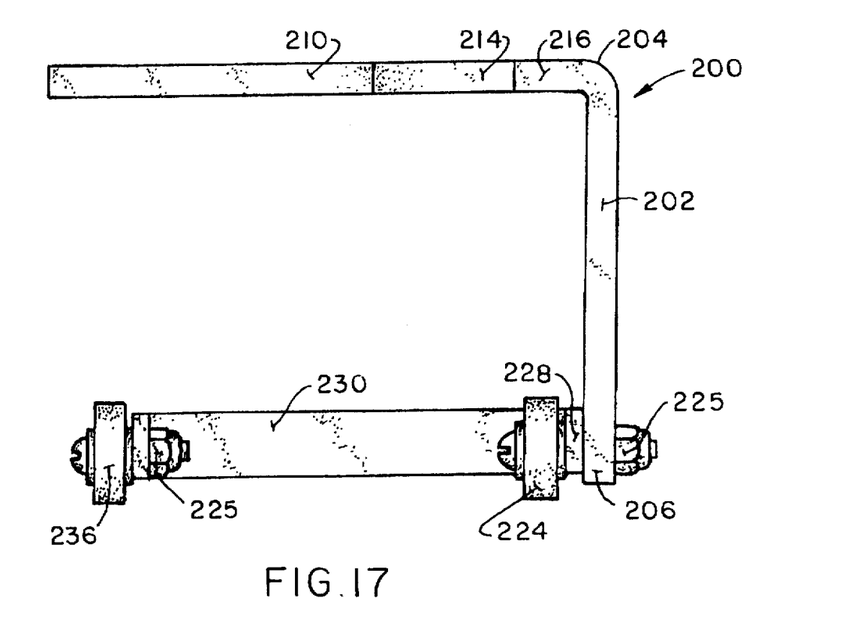
FIG. 17 is a front elevational view thereof.
Figure 18:
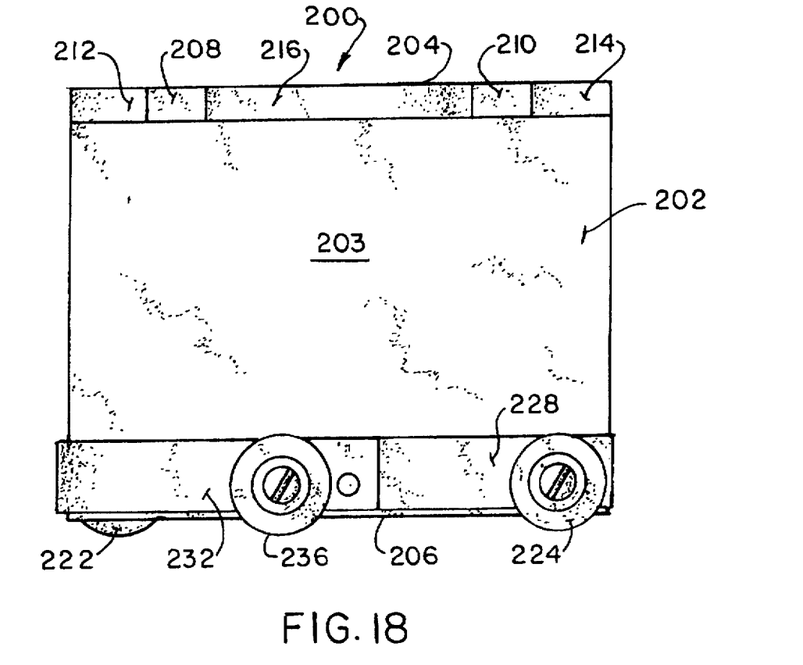
FIG. 18 is side elevational view thereof.
Figure 19:
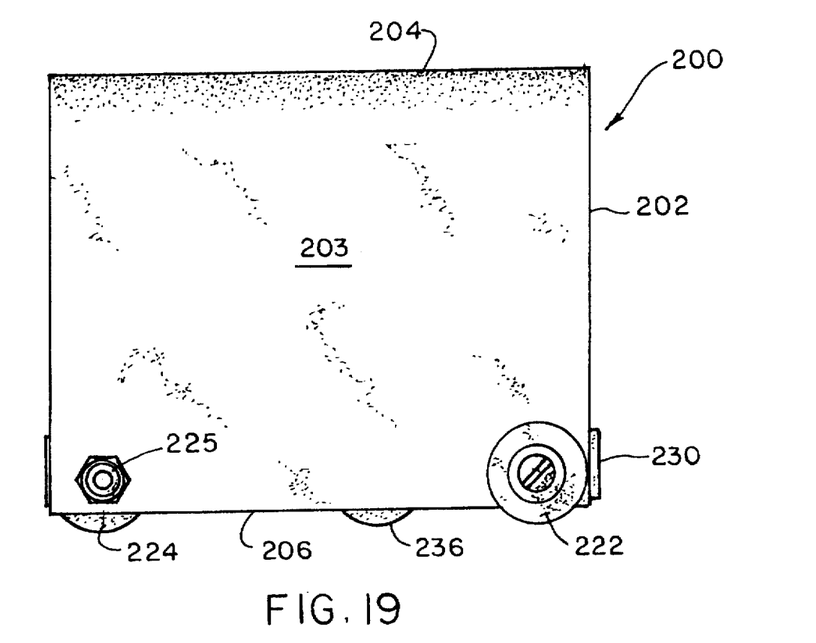
FIG. 19 is another side elevational view thereof of the side opposite that shown in FIG. 18.

The novel mobile holder for the hand-held unit or scanner 3 is indicated generally in FIGS. 14–19 by reference numeral 200. As illustrated in FIG. 14, holder 200 is designed to allow the releasable seating of the hand-held unit or scanner 3.

Holder 200 had a vertical side support 202. Side support 202, in the illustrated embodiment, is a vertical wall having a generally rectangular shape web 203. Side support 202 has a predetermined height that determines the elevation of the seated scanner 3 as will be described below. It will be appreciated that the side support 202 could be a rectangular frame or other such structure that functions in the same manner as the vertical wall shown. Side support 202 has an top edge 204 and a bottom edge 206. A first horizontal support arm 208 and a second, spaced apart horizontal support arm 210 extend laterally from top edge 204. As shown, the respective support arms are generally elongated flat structures having broadened flat joining areas 212 and 214 respectively that are integrally connected to a lip 216 extending laterally from top edge 204 of vertical side support 202. Support arms 208 and 210 define an open-ended space 220 therebetween. Space 220 is dimensioned to seat scanner 3 as will be explained.

There is a first wheel 222 and a second, spaced apart wheel 224 rotatably attached to bottom edge 205 of the vertical support. In the embodiment shown, wheel 222 extends from the back side of side support 202 and wheel 224 extends from the front side of the side support. This arrangement allows wheel 222 to be out from under space 220. Such an arrangement also provides good stability, however, other arrangements or wheel alignments that leave a substantially clear area under space 220 are within the scope of the invention. The respective wheels can be conventional wheels made of nylon or other suitable, non-abrasive material and connected to the support with nut and bolt assemblies 225, which have bushings and function as axels.

A bottom, laterally extending support member 226 extends outwardly from the bottom edge 206 of the vertical support. In the embodiment shown, the support 226 is a substantially J-shaped member having an elongated horizontal section 228 which is appropriately attached across the inside length of bottom edge 206. In the embodiment shown, section 228 is attached to the web with the nut and bolt assemblies 225 that are used to attach the wheels. There is a perpendicular midsection 230, and a relatively short end section 232. The perpendicular midsection 230 extends away from the vertical support 204 and is substantially parallel to the support arms 208 and 210. A third wheel 236 is appropriately attached to end section 232. It will be noted that the perpendicular midsection 230 extends outwardly from a lower corner of the vertical support. As can best be seen in FIG. 15, this arrangement allows the area below space 220 to be substantially free of obstacles. When scanner 3 is mounted in holder 200, the camera has a clear view.

It will be noted in the preferred embodiment, the respective wheels 222,224 and 236 are in a substantially triangular arrangement which improves the stability of holder 200 as it is manipulated across the object to be viewed.

As shown in FIG. 14 the scanner 3 is slidingly engaged in opening 220. The flat arms 208 and 210 engage the underside of housing 105 at the wider transition area between the bottom 107 and top 109 of housing 105. As stated above, the arrangement of the wheels and the positioning of the bottom support allow for a relatively obstruction-free area under the scanner. Also as stated above, the vertical support 202 is a predetermined height so as to elevated scanner 3 a predetermined height above the object being scanned when slidingly engaged in opening 220. The height of support 220 can be varied depending upon application or to make the position of the scanner ergometrically sound. The wheels 222, 224 and 236 engage the object to be scanned and easily roll to improve mobility of the scanner 3.

As variations within the scope of the appended claims may be apparent to those skilled in the art, the foregoing description is set forth only for illustrative purposes and is not meant to be limiting. The mobile holder 200 can be dimensioned appropriately so as to either raise or lower scanner 3 relative to the object to be read. Further, the vertical support could be constructed so that it could be adjustable so as to adjust the overall height of the holder 200. For example the wall could be divided horizontally and arranged in an overlapped, sliding arrangement secured by a small bold and wing through elongaged slots formed in each section to permit changing the overall height of the wall. Further, the laterally extending bottom support can be constructed in a manner other than a one piece J-shaped member as long as the associated wheel is appropriately positioned. These examples are merely illustrative.

We claim:

1. A magnifying device for magnifying an object and displaying an object on a monitor, the device including:
 a hand-held unit which, when used, is placed in close proximity to the object to be magnified, the hand-held unit having:
  a housing including a top, a bottom, and side walls; said bottom defining an opening;
  legs depending from the bottom;
  rollers rotatably connected to the legs at a bottom end of the legs to facilitate movement of the hand-held unit over the object;
 a mobile hand-held unit holder removably attached to the hand-held unit for elevating said hand-held unit above the object to be read and for increasing mobility of said hand-held unit over the object;
 said mobile hand-held unit holder having an upper support member, a bottom support member, and a side support structurally connected between said upper and bottom support members, for holding said hand-held unit to said upper support member;
 a solid state camera housed in said hand-held unit above said opening which converts an optical signal to an electric signal, said camera including a lens, said lens being focusable;
 a focusing control for focusing said camera lens;
 a zoom control for altering the size of the image displayed on the monitor; and
 a base unit, said hand-held unit being electrically connected to said base unit to transmit the signal produced by said camera to said base unit, said base unit being connectable to the monitor to display the signal produced by the camera on the monitor.

2. The magnifying device of claim 1 wherein said hand-held unit is sufficiently small to be held in the hand of a user.

3. The magnifying device of claim 2 including an on/off switch, said on/off switch being housed on said hand-held unit, said on/off switch being operable to turn on and off the magnifying device.

4. The magnifying device of claim 1 including inverting circuitry for inverting the colors of the display and an inverting switch for activating and deactivating said inverting circuitry; said inverting circuitry being housed in said base unit and said inverting switch being housed on said hand-held unit, said inverting switch being operably connected to the inverting circuitry to activate and deactivate the circuitry.

5. The magnifying device of claim 1 including a corrective lens positioned beneath said camera lens, said corrective lens being operable to prevent distortion of the object magnified by the device.

6. The magnifying device of claim 5 wherein the corrective lens has an upper surface and a lower surface, said upper and lower surfaces both being convex.

7. The magnifying device of claim 1 wherein said lens having upper and lower surfaces, said upper surface has a radius $R_1$ and said lower surface has a radius of $R_2$, the radius $R_1$ being larger than the radius $R_2$.

8. In combination, a monitor chosen from the group consisting of a video monitor and a television, a magnifying device for magnifying an object and displaying the object on a desired one of said video monitor and said television, and a cable for operatively connecting said magnifying device to said desired monitor;
 the device including;
  a hand-held unit;
  a mobile hand-held unit holder for releasably attaching the hand-held unit and positioning the hand-held unit in an elevated position above the object being magnified;
  said holder having an upper support means and a bottom support member, there being a space provided between said members, and a side support structurally connecting the upper support means with the bottom support member, and said holder having an opening there through;
  a solid state camera housed in said hand-held unit above said opening which converts an optical signal to an electrical signal, said camera including a lens, said lens being focusable;
  a base unit, said hand-held unit being electrically connected to said base unit to transmit the signal produced by said camera to said base unit, said base unit being connectable to the monitor to display the signal produced by the camera on the monitor; said base unit including a video out terminal, an RF IN terminal, and an RF OUT terminal.

9. A magnifying device for magnifying an object and displaying the object on a monitor, the device including:
 a hand-held unit, said hand-held unit being sufficiently small to be held in the hand of a user, and said hand-held unit, which, when used, is placed in close proximity to the object to be magnified, the hand-held unit having;
  a housing including top, a bottom, and side walls, said bottom defining an opening;
  legs depending from the bottom;
  rollers rotatably connected to the legs at a bottom end of the legs to facilitate movement of the hand-held unit over the object;
 a mobile hand-held unit holder removably attached to the hand-held unit, for elevating said hand-held unit above the object to be read and for increasing mobility of said hand-held unit over the object;
 a solid state camera housed in said hand-held unit above said opening which converts an optical signal to an electrical signal, said camera including a lens, said lens being focusable;
 a focusing control for focusing said camera lens;
 a zoom control for altering the size of the image displayed on the monitor;
 a base unit, said hand-held unit being electrically connected to said base unit to transmit the signal produced by said camera to said base unit, said base unit being connectable to the monitor to display the signal produced by the camera on the monitor;
 said hand-held unit further comprises a frame having two spaced apart arms, said arms defining a space in between disposed to seat said hand-held unit, the arms being attached at one end to a side support member, said side support member having a first and second spaced apart wheels at a bottom end, and a laterally extending support member extending from said bottom end of said side member, said laterally extending support member having a third wheel on a distal end thereof, said aforementioned wheels being in a triangular arrangement for stability.

10. The magnifying device of claim 9 including a switchboard; said switchboard including an on/off switch and an inverting switch; said on/off switch and said inverting switch being electrically connected to said switchboard and being accessible through said hand-held unit housing; said camera being operatively connected to said switchboard and said switchboard being operably connected to said base unit to transmit the signal produced by said camera to said base unit.

11. The magnifying device of claim 9 including a light which illuminates the object to be displayed on the monitor.

12. The magnifying device of claim 11 wherein said light is mounted to an outer surface of said hand-held unit housing bottom and is house in a defuser.

13. The magnifying device of claim 11 wherein said light is positioned adjacent said hand-held unit bottom opening.

14. A magnifying device for magnifying an object and displaying the object on a monitor, the device including:

a hand-held unit which, when used, is placed in close proximity to the object to be magnified, the hand-held unit having:

a housing including a top, a bottom, and side walls; said bottom defining an opening;

legs depending from the bottom;

rollers rotatably connected to the legs at a bottom end of the legs to facilitate movement of the hand-held unit over the object;

a mobile hand-held unit holder removeably attached to the hand-held unit for elevating said hand-held unit above the object to be read and for increasing mobility of said hand-held unit over the object;

a solid state camera housed in said hand-held unit above said opening which converts an optical signal to an electrical signal, said camera including a lens, said lens being focusable;

a focusing control for focusing said camera lens; and         a zoom control for altering the size of the image displayed on the monitor;

a base unit, said hand-held unit being electrically connected to said base unit to transmit the signal produced by said camera to said base unit, said base unit being connectable to the monitor to display the signal produced by the camera on the monitor;

said camera being mounted to a mounting board, said mounting board defining an opening through which said camera lens extends;

said focusing control includes a focusing knob operably connected to said camera lens to move said camera lens to focus said camera, said focusing control includes a focusing rod which rotatably extends through said mounting board and said housing, said focusing knob being fixed to said rod externally of said hand-held unit housing, a pulley fixed to a bottom of said focusing rod beneath said mounting board, and a band operatively engaging said pulley and said camera lens, such that when said focusing knob is rotated, said camera lens is rotated.

15. The magnifying device of claim 14 wherein a zoom control is operatively connected to said mounting board to vertically move said mounting board to change the distance between said camera lens and said object being magnified; said mounting board being mounted in said hand-held unit housing for vertical movement relative to said housing, said housing having at least one guide rod extending between the top and bottom of said housing, said mounting board being journaled over said guide rod.

16. The magnifying device of claim 15 including a linear bearing which passes through said mounting board, said guide rod extending through said linear bearing.

17. The magnifying device of claim 15 wherein said zoom control includes an elongate zoom rod rotatably journaled about said focusing rod, a helical groove being formed in said zoom rod, a vertically fixed pin which engages said zoom rod groove, such that when said zoom rod is rotated, it moves vertically relative to said housing; said zoom rod being mounted intermediate the focusing knob and the mounting board, such that the zoom rod is vertically fixed relative to the focusing rod; whereby, when the zoom rod is moved vertically, the focusing control, and hence the mounting board and camera, are moved vertically.

18. In a hand-held unit for an electronic magnifying device for magnifying and displaying text on a monitor; the hand-held unit functioning as a holder and including a housing including a top, a bottom, and side walls; said bottom defining an opening, legs depending from a bottom rollers rotatably connected to the legs at a bottom end of the legs to facilitate movement of the hand-held unit over the object, a solid state camera housed in said hand-held unit above said opening which converts an optical signal to an electrical signal, said camera including a lens, said lens being focusable, a corrective lens disposed below said camera lens to prevent distortion of the object magnified by the device, a focusing control for focusing said camera lens, and a zoom control for altering the size of the image displayed on the monitor, said zoom control being interconnected with said focusing control such that when said zoom control is operated, said image does not have to be refocused, the improvement comprising:

a mobile for the hand-held unit removeably attached to the hand-held unit, the holder further comprising a vertical end member having a pair of spaced apart wheels at a lower end thereof, a pair of spaced apart support arms extending laterally from an upper end of the vertical end member, said spaced apart support arms defining a space disposed to seat the hand-held unit, a laterally extending support member extending from the lower end of the vertical end member, said laterally extending support member being is substantially parallel relationship with the support arms, said laterally extending support member having a wheel at a distal end, the aforementioned wheels being in a substantially triangular relationship for stability, the vertical end member being of a predetermined length so as to elevate the hand-held unit a predetermined distance above the object being read.

19. A mobile holder for releaseably holding a hand-held unit of a magnifying device, comprising:

a substantially vertical end support member;

first and second spaced apart wheels on a bottom end of the support member;

a pair of spaced apart, laterally extending support arms at a top end of the support member, said pair of spaced apart, laterally extending support arms defining a spaced disposed to seat the hand-held unit;

a laterally extending support member at the bottom end of the support member, the laterally extending support member being in a substantially parallel arrangement with at least one of the support arms; and     a wheel at a distal end of the laterally extending support member;

said aforementioned wheels being in a generally triangular arrangement to increase stability of the mobile holder.

\* \* \* \* \*